(12) United States Patent
Taivalkoski et al.

(10) Patent No.: US 6,375,434 B1
(45) Date of Patent: Apr. 23, 2002

(54) PUMP/METER COMBINATION

(75) Inventors: Tom Taivalkoski, Fort Wayne, IN (US); Harald Görres, Weilheim; Hans Ulrich Bloss, Nuremberg, both of (DE)

(73) Assignee: Tokheim Corporation, Fort Wayne, IN (US)

( * ) Notice: Subject to any disclaimer, the term of this patent is extended or adjusted under 35 U.S.C. 154(b) by 0 days.

(21) Appl. No.: 09/595,211

(22) Filed: Jun. 16, 2000

Related U.S. Application Data

(60) Provisional application No. 60/181,160, filed on Feb. 9, 2000.

(51) Int. Cl.[7] ............... F04B 49/00; F01C 21/00; G01F 15/00; G01F 1/05
(52) U.S. Cl. ................. 417/63; 418/2; 73/861.77; 73/861.79
(58) Field of Search ............... 417/63; 418/2; 73/861.77, 861.79

(56) References Cited

U.S. PATENT DOCUMENTS

| | | | |
|---|---|---|---|
| 2,188,849 A | 1/1940 | Svenson ............... 222/36 |
| 2,835,229 A | 5/1958 | Richards ............... 418/7 |
| 4,542,836 A | * 9/1985 | Sparks et al. ............... 222/27 |
| 5,150,612 A | 9/1992 | Lew ............... 73/253 |
| 5,257,919 A | 11/1993 | Lew ............... 418/7 |
| 5,269,668 A | 12/1993 | Lew et al. ............... 418/241 |
| 5,447,062 A | * 9/1995 | Kopl et al. ............... 73/261 |
| 5,601,414 A | * 2/1997 | DiRe ............... 417/44.2 |
| 5,704,767 A | 1/1998 | Johnson ............... 418/2 |
| 5,727,933 A | 3/1998 | Laskaris et al. ............... 418/2 |
| 5,772,403 A | * 6/1998 | Allison et al. ............... 417/44.2 |
| 6,089,102 A | * 7/2000 | Bloss ............... 73/861.03 |
| 6,250,151 B1 | * 6/2001 | Tingleff et al. ............... 73/261 |

* cited by examiner

Primary Examiner—Charles G. Freay
Assistant Examiner—Michael K. Gray
(74) Attorney, Agent, or Firm—Randall J. Knuth

(57) ABSTRACT

An integrated pump and meter having a spindle axially extending in the direction of the flow of fluid for pumping and metering the flow of fluid. A volume of fluid pumped is calculated as a function of spindle rotation. In one particular of embodiment, a pair of pressure sensors are located at the inlet and outlet of the pump/meter, respectively for computing a gap loss volume due to fluid passing between the pump/meter spindle and the cylinder wall. The gap loss volume and calculated flow volume are combined to calculate a total volume of fluid to be dispensed.

28 Claims, 3 Drawing Sheets

PUMP/METER COMBINATION

This application claims the benefit of provisional application 60/181,160, filed Feb. 9, 2000.

BACKGROUND OF THE INVENTION

1. Field of the invention.

The present invention relates to an integrated pump and meter, and in particular a pump/meter combination with at least one spindle for pumping and metering the flow of fluid.

2. Description of the related art.

Traditional fuel dispensers contain a separate fuel pump and meter. In addition, a fuel dispenser may contain an air separator system for removing air from the fuel prior to metering. An air separator removes dissolved gases which may be present in the fuel. It is necessary to remove these dissolved gases before metering the fuel in order-to achieve an accurate measurement of the volume of fuel to be dispensed. The pump supplies fuel from a fuel storage tank. The meter is traditionally located downstream from both the pump and the air separator system.

One limitation of many traditional fuel dispensers is the need for a separate pump and meter. Due to a need for accuracy, the use of a combination pump/meter has not been feasible. Current regulations require accuracy for fluid metering not previously achievable by traditional pump/meter units.

One factor which prevents traditional fuel dispensers from utilizing a combination pump/meter unit is the presence of dissolved gases within the fluid, which affects metering accuracy. Conventional air separator systems will typically only function properly when located at the outlet side of a fuel pump. This is due to the fact that fluid pressure on the outlet side of a pump is higher than pressure on the inlet of the pump. Due to this design limitation, however, current fuel dispensers cannot utilize a combination pump/meter system since it is necessary to have the air separator located between the pump and the meter.

A second factor which affects the accuracy of traditional spindle meters is the inability to accurately account for gap losses in the metering process. Gap losses are associated with fluid which passes between the spindle and the cylinder wall which houses the spindle. When fluid passes between the spindle and the cylinder wall, this gap loss fluid volume is not accounted. Consequently, metering error is introduced due to gap losses.

An additional disadvantage in the art of pumps and meters for fuel dispensers is the cost associated with manufacturing and installing two separate components.

What is needed in the art is an integrated pump and meter which pumps and accurately measures the volume of fluid to be dispensed.

SUMMARY OF THE INVENTION

According to the present invention, an integrated pump and meter pumps fluid and volumetrically measures the fluid flow for accurately measuring the fluid to be dispensed as a function of fluid flow.

The invention, in one form thereof, is an integrated pump and meter for pumping a fluid and metering fluid flow. The integrated pump and meter includes an inlet and an outlet. The fluid may proceed along a fluid axis. At least one spindle extends axially along the fluid flow axis. A motor is operatively associated with at least one spindle for effecting rotation of the spindle. Rotation of the spindle produces the fluid flow. A rotation sensor detects rotation of the spindle. In one further embodiment thereof, a pair of pressure sensors are disposed in proximity of the inlet and the outlet for measuring an inlet and outlet pressure, respectively. In an alternate embodiment, there are a separate pump spindle and meter spindle, whereby the pump is operatively associated with the pump spindle and the rotational sensor is operatively associated the meter spindle.

The invention, in another form thereof, is a method of simultaneously pumping fluid and metering fluid flow. The method includes the step of providing an integrated pump and meter having an inlet and an outlet and at least one spindle. The rotation of at least one spindle is monitored and a pressure difference is measured between an inlet pressure and an outlet pressure. The volume of fluid flow is determined as a function of a spindle rotation and pressure difference. In one particular embodiment, fluid is pumped by applying rotational energy to the spindle. In an alternate embodiment, the pump/meter includes two spindles, a pump spindle for pumping the fluid, and a meter spindle for metering the flow of fluid.

The invention, in yet another embodiment thereof, is a fuel dispenser which performs the functions of pumping a fluid and metering fluid flow. The fluid dispenser includes a hose with a nozzle and an output device. A pump/meter includes an inlet and an outlet. The fluid may proceed along a fluid flow axis. At least one spindle extends axially along the fluid flow axis. A motor is operatively associated with the spindle for effecting rotation of the spindle. Rotation of the spindle produces a fluid flow. A rotation sensor detects rotation of the spindle. In one further embodiment, a pair of pressure sensors are located in proximity of the inlet and outlet for measuring inlet and outlet pressure, respectively. In an alternate embodiment, computational means generates a flow volume signal. The computational means is operatively associated with the rotational sensor. The flow volume signal is operatively associated with the output device for displaying a volume of fluid to be dispensed.

One advantage of the present invention is the integration of a pump and a meter into a single unit. As a result, a single unit can be manufactured and installed into a fuel dispenser rather than two separate components. In addition, there is a cost saving associated with the manufacturing and installing a single unit rather than two separate components.

A second advantage of the present invention is the accuracy by which the pump/meter combination computes the volume of fuel to be dispensed. In one particular embodiment, pressure sensors are located at the inlet and outlet of a pump/meter. A gap loss attributed to fluid passing between the spindle cylinder wall and the spindle is computed as a function of pressure difference between the inlet and the outlet pressure of the pump/meter. As a result, accurate volumes can be calculated as a function of spindle rotation and a pressure difference between the inlet and outlet fluid pressures of the pump/meter.

A third advantage to the present invention is the use of a single spindle for both pumping and metering functions. Rotational energy is applied to the spindle which then provides for a fluid flow. A sensor is associated with the spindle for monitoring the spindle's rotation. As a result, a volume of fluid dispensed is calculated as a function of spindle rotation.

One advantage of a single spindle pump/meter system is a decrease in parts and complexity of the unit. Consequently, there is a cost associated with decreasing the complexity and number of components.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
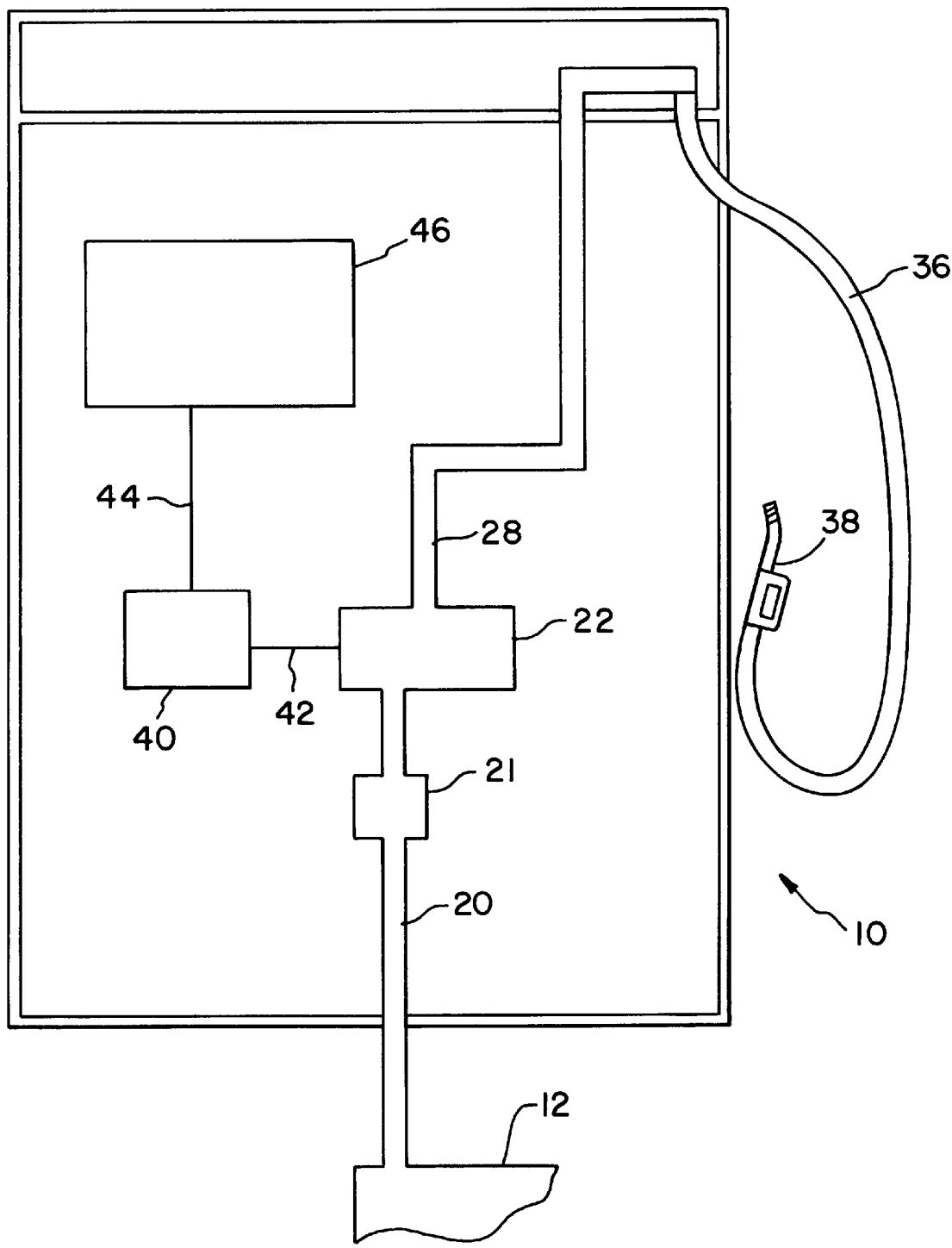
FIG. 1 is a sectional, diagrammatical view of a fuel dispenser incorporating the present invention.

Referring now to the drawings and particularly to FIG. 1, there is shown a fuel dispenser 10 incorporating the present invention. Fuel dispenser 10 includes fuel supply 12.

Supply piping 20 supplies fuel from fuel supply 12 through air separator 21 and on to fuel pump/meter 22.

Air separator 21 removes dissolved gasses from the fuel and may be of any of a number of designs known in the art. In the preferred embodiment, air separator 21 is a centrifugal air separator as disclosed in the United States patent application, Ser. No. 09/303,776, which is hereby incorporated by reference.

When activated, pump/meter 22 pumps fuel from fuel supply 12 through supply pipe 20. Outlet pipe 28 supplies fuel between pump/meter 22 and hose 36. Nozzle 38 provides an exit for fuel to be dispensed from dispenser 10.

Pump/meter 22 is operatively associated with computational means 40 by line 42. Computational means 40 generates a volume signal 44 which is operatively associated with output device 46. Output 46 displays a volume of fluid to be dispensed from dispenser 10.

During operation of fuel dispenser 10, pump/meter 22 pumps fuel from fuel supply 12. Pump/meter 22 measures the flow of fuel through pump/meter 22. Computational means 40 computes a volume of fluid to be dispensed as a function of fluid flow. The volume of fluid to be dispensed is displayed on output device 46.

Figure 2:
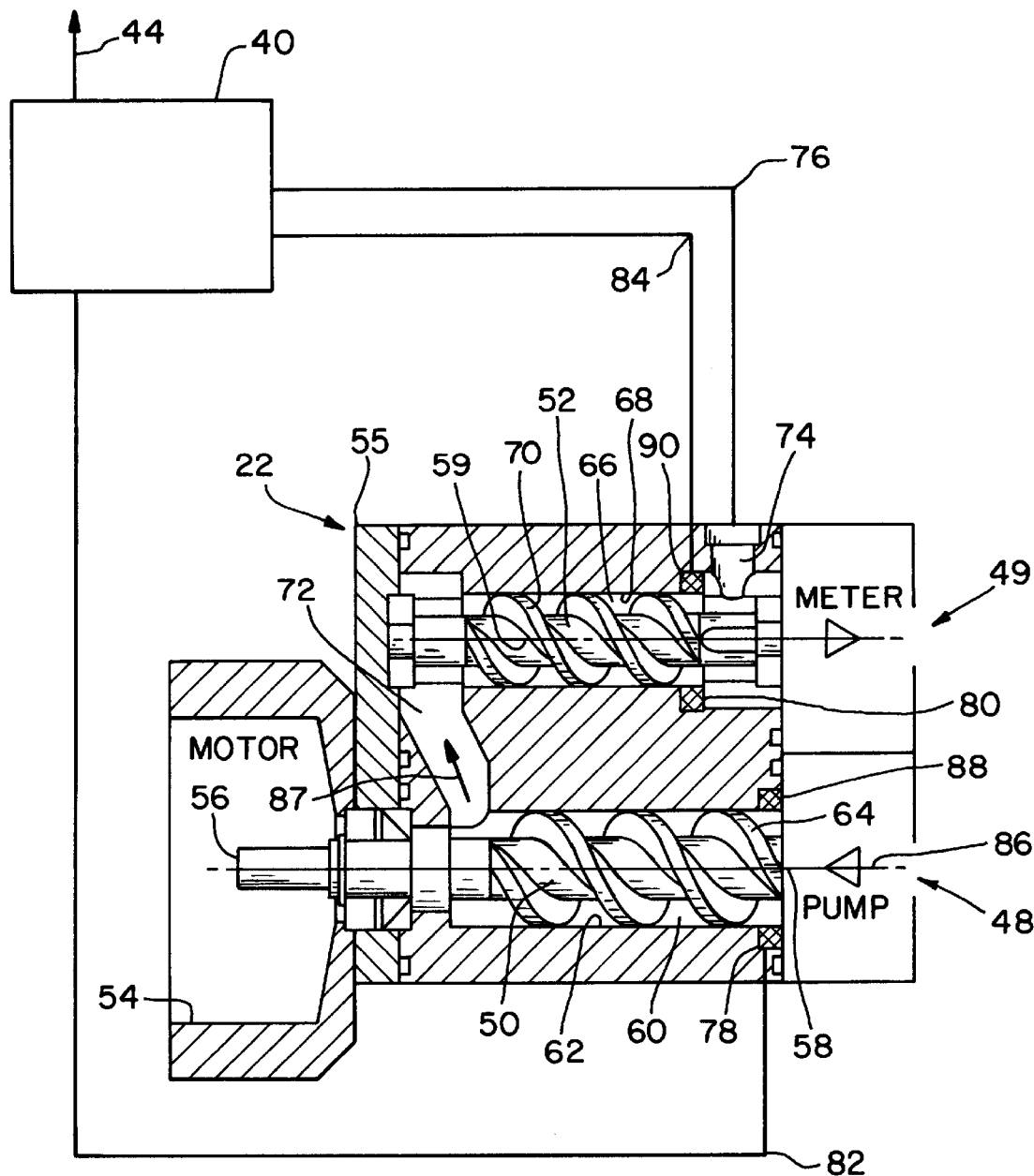
FIG. 2 is a cross-sectional view of a pump/meter of the present invention incorporating a separate pump spindle and meter spindle.

Referring now to FIG. 2, pump/meter 22 includes pump spindle 50, meter spindle 52, and pump motor 54, all disposed in a single housing 55. Pump spindle 50 extends axially in the direction of first fluid flow axis 58. Pump spindle 50 is rotatably disposed within pump cylinder 60 having pump cylinder wall 62. Pump spindle radial edge 64 abuts pump cylinder wall 62.

Pump motor 54 is connected to pump spindle shaft 56 for providing rotational energy to pump spindle 50. Fluid enters pump/meter 22 through inlet 48 and fluid exits through outlet 49.

Meter spindle 52 is rotatably disposed within meter cylinder 66 having meter cylinder wall 68. Meter spindle radial edge 70 abuts meter cylinder wall 68. Meter spindle 52 extends axially in the direction of second fluid flow axis 59. Chamber 72 provides fluid communication between pump cylinder 60 and meter cylinder 66.

Rotation sensor 74 detects rotation of meter spindle 52. Rotation sensor 74 produces meter signal 76 which is communicated to computational means 40. Meter signal 76 corresponds to the rotation of meter spindle 52.

Rotation sensor 74 may be any rotation sensor means capable of detecting rotation of meter spindle 52 and generating a meter signal 76. Meter signal 76 may be a pulse corresponding to each rotation of meter spindle 52. Rotation sensor 74 may consist of an optical sensor, a magnetic pick-up, a current transducer, or other rotation sensor means capable of performing the functions of rotation sensor 74.

A pair of pressure sensors 78, 80 may be located in the proximity of inlet 48 and outlet 49 respectively. Pressure sensors 78, 80 measure the pressure of the fuel entering pump cylinder 60 and exiting meter cylinder 66 respectively. Pressure sensors 78, 80 generate an inlet pressure signal and an outlet pressure signal along signal lines 82, 84 respectively. Inlet pressure signal line 82 and outlet pressure signal line 84 are communicated to computational means 40. Computational means 40 computes a pressure difference between the inlet pressure and the outlet pressure sensed by pressure sensors 78, 80.

During the operation of pump/meter 22, motor 54 applies rotational energy to pump spindle 50 to effect rotation of pump spindle 50. As a result, fuel is pumped through pump cylinder 60 in the direction as indicated by arrow 86. Pressure sensor 78 detects an inlet pressure and generates inlet pressure signal 82 which is communicated to computational means 40. The fuel pumped proceeds from pump cylinder 6b through connecting chamber 72, as indicated by arrow 87, and onto meter cylinder 66.

As the fuel proceeds through meter cylinder 66, the fuel exerts a force on meter spindle 52. The force applied on meter spindle 52 promotes rotation of meter spindle 52 within meter cylinder 66. Rotation sensor 74 detects the rotation of meter spindle 52 and in turn generates meter signal communicated downline 76. Outlet sensor 80 measures the fuel pressure in the proximity of outlet 49 and generates an outlet pressure signal on line 84 indicative of the outlet pressure. Computational means 40 computes a pressure difference between the measured inlet pressure and the measured outlet pressure.

Computational means 40 computes a total volume of fluid to be dispensed as a function of meter spindle 52 rotation and a pressure difference between inlet and outlet pressures. Computation means 40 is calibrated to the rotation of meter spindle 52 whereby a discrete rotation of meter spindle 52 corresponds to volume of fuel passing through pump meter 22.

While pump/meter 22 operates, some fuel may pass between meter spindle radial edge 70 and meter cylinder wall 68. The volume of fuel which passes between meter spindle radial edge 70 and meter cylinder wall 68 is a gap loss volume. The gap loss volume does not contribute to the rotation of meter spindle 52; consequently, the gap loss volume is not measured through the rotation of meter spindle 52.

The gap loss volume is computed as a function of pressure difference between inlet pressure and outlet pressure. Further improvements of accuracy in computing a gap loss volume may be realized through the use of inlet temperature sensor 88 and outlet temperature sensor 90, which measure an inlet fluid temperature and an outlet fluid temperature respectively. The factors that computational means 40 uses for computing a gap loss volume are pressure difference, and the temperature and viscosity of the fuel.

In one embodiment of the separate pump and meter spindle, gap losses do not have to be taken into account because the pressure drop between input and output of the metering spindle is quite low and therefore do not have a very significant influence. In other forms of the invention with large pressure drops, such factors and relationship to calculate volume may be determined empirically and stored in an electronic lookup table, or the like.

Computational means 40 combines the volume of fluid computed as a function of meter spindle 52 rotation with the gap loss volume to compute a total volume of fluid to be dispensed.

Figure 3:
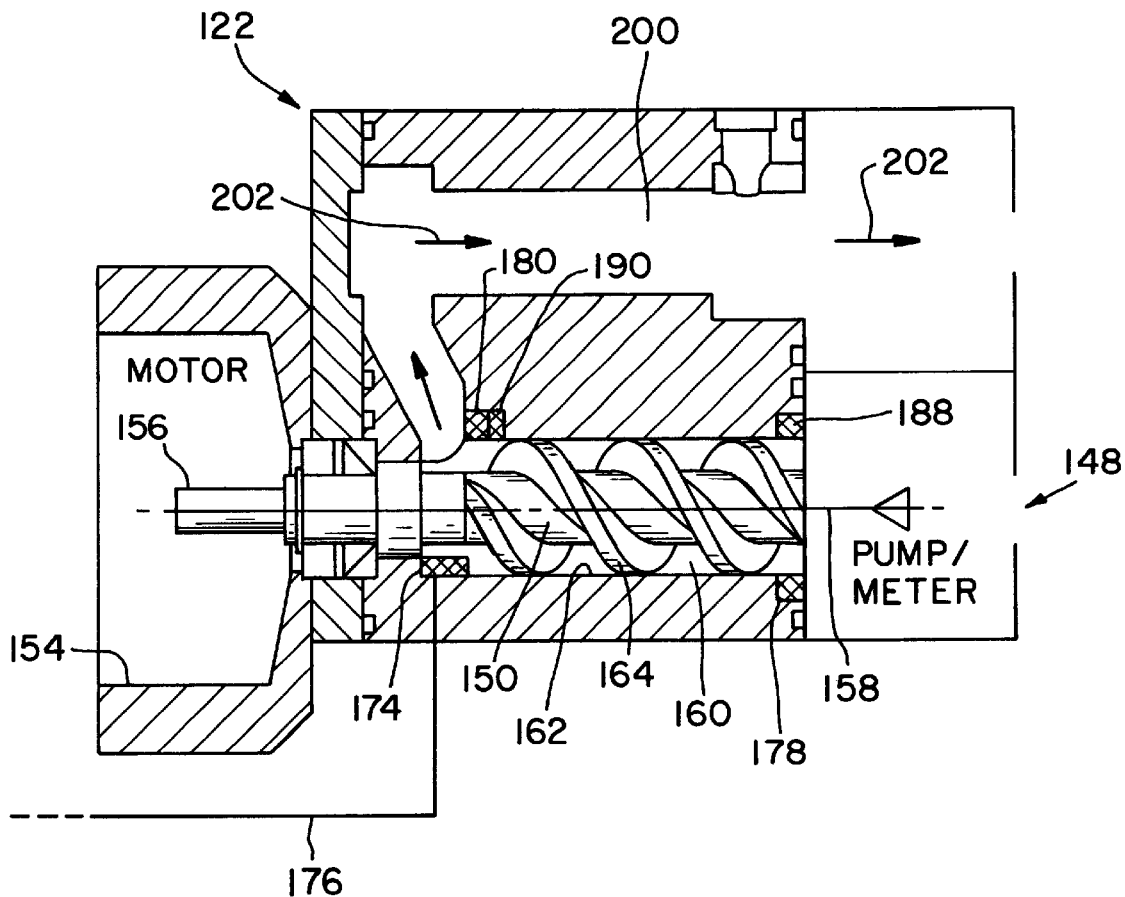
FIG. 3 is a cross-sectional view of a pump/meter of the present invention utilizing a single spindle.

Referring now to the embodiment of FIG. 3, pump/meter 122 consists of a single pump/meter spindle 150 having a shaft 156. Spindle 150 is disposed within a chamber 160 in pump/meter 122. Pump motor 154 is connected to pump/meter shaft 156 for providing rotation to pump/meter spindle 150. Rotation sensor 174 detects rotation of pump/meter spindle 150. Inlet pressure sensor 178 measures an inlet pressure and outlet pressure sensor 180 measures an outlet fluid pressure. Inlet temperature sensor 188 and outlet temperature sensor 190 measure an inlet temperature and outlet temperature respectively.

During the operation of pump/meter 122, fuel enters pump/meter 122 through inlet 148. The fuel exits pump/meter cylinder 160 through a chamber 200 and proceeds out of pump/meter 122 as indicated by arrows 202. The fuel is pulled into pump/meter cylinder 160 as motor 154 rotates pump/meter spindle 150. Inlet pressure sensor 178 measures the fuel pressure in the proximity of inlet 148. Temperature sensor 188 measures the temperature of the fuel in the proximity of inlet 148. Rotation sensor 174 detects the rotation of pump/meter spindle 150 and generates a meter signal on line 176 which is communicated to a computational means 40.

Computation means 40 generates a volume corresponding to the rotation of pump/meter spindle 150. Computational means 40 further computes a gap loss volume or total volume as a function of measured or pressure difference between an inlet pressure, as measured by inlet pressure sensor 178, and outlet pressure, as measured by outlet pressure sensor 180. The temperature of the fuel at the inlet and outlet of pump/meter cylinder 160 are also communicated to computation means 40 for use when computing a gap loss volume. Computational means 40 combines the fuel volume calculated as a function of pump/meter spindle 150 rotation with the gap loss volume to compute a total volume of fuel to be dispensed by dispenser 10.

One advantage of the embodiment as depicted in FIG. 3 is a decrease in the number of parts needed to achieve the functions of both pumping and metering the flow of fuel. As a result of fewer parts, pump/meter 122 is less expensive to manufacture, assemble and to install into a fuel dispenser. In addition, pump/meter 122, with fewer parts, requires less maintenance than one with more parts.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An integrated pump and meter for pumping a fluid and metering fluid flow, comprising:
   a housing having an inlet and an outlet;
   a fluid flow axis upon which the fluid may proceed;
   at least one spindle extending axially along said fluid flow axis;
   a motor operatively associated with said at least one spindle for effecting rotation of said at least one spindle, rotation of said at least one spindle producing the fluid flow; and
   rotation sensor means for detecting rotation of said at least one spindle.

2. The integrated pump and meter according to claim 1, further comprising:
   a pair of pressure sensors, one said pressure sensor disposed in proximity of said inlet and a second said pressure sensor disposed in proximity of said outlet for measuring an inlet pressure and an outlet pressure, respectively.

3. The integrated pump and meter according to claim 1, further comprising:
   computational means for computing a flow volume, said computational means is operatively associated with said rotational sensor means.

4. The integrated pump and meter according to claim 3, further comprising:
   said computational means operatively associated with said pair of pressure sensors;
   said computational means computing a pressure difference between said inlet pressure and said outlet pressure; and
   said computational means computes said flow volume as a function of said at least one spindle rotation and said pressure difference.

5. The integrated pump and meter according to claim 4, wherein said computational means further computes said flow volume as a function of fluid viscosity, temperature, and fluid composition.

6. The integrated pump and meter according to claim 1 wherein said at least one spindle comprises a screw spindle.

7. The integrated pump and meter according to claim 1, further comprising at least one temperature sensor.

8. The integrated pump and meter according to claim 1 further comprising:
   said at least one spindle comprising a pump spindle and a meter spindle, said motor is operatively associated with said pump spindle and said rotational sensor means is operatively associated with said meter spindle.

9. The integrated pump and meter according to claim 8, further comprising:
   a pair of pressure sensors, one said pressure sensor disposed in proximity of said inlet and a second said pressure sensor disposed in proximity of said outlet for respectively measuring an inlet pressure and an outlet pressure.

10. The integrated pump and meter according to claim 8, further comprising:
    computational means for computing a flow volume, and said computational means is operatively associated with said rotational sensor means.

11. The integrated pump and meter according to claim 10, further comprising:
    said computational means operatively associated with said pair of pressure sensors;

said computational means computing a pressure difference between said inlet pressure and said outlet pressure; and said computational means computes said flow volume as a function of said at least one spindle rotation.

12. The integrated pump and meter according to claim 11, wherein said computational means further computes said flow volume as a function of fluid viscosity, temperature, and fluid composition.

13. The integrated pump and meter according to claim 8 wherein said at least one spindle comprises a screw spindle.

14. The integrated pump and meter according to claim 8, further comprising at least one temperature sensor.

15. A method of simultaneously pumping fluid and metering fluid flow, comprising the steps of:

providing an integrated pump and meter having an inlet and an outlet and at least one spindle;

monitoring rotation of at least one spindle;

measuring a pressure difference between an inlet pressure and an outlet pressure; and determine the volume of fluid flow as a function of spindle rotation and pressure difference.

16. The method according to claim 15, further comprising the step of:

pumping fluid by applying rotational energy to the spindle.

17. The method according to claim 16, wherein the rotational energy is supplied by a pump motor operatively associated with the at least one spindle for affecting rotation therein.

18. The method according to claim 17, wherein the at least one spindle comprises a pump spindle and a meter spindle, the pump spindle is operatively associated with the pump motor and said meter spindle is monitored for rotation.

19. The method according to claim 15 further comprising the step of measuring the temperature of fluid.

20. The method according to claim 19 further determining the said fuel flow as a function of spindle rotation and temperature.

21. A fuel dispenser which performs the function of pumping a fluid and metering fluid flow, comprising:

a hose with nozzle;

an output device; and a pump/meter comprising:
    a housing having an inlet and an outlet;
    a fluid flow axis upon which the fluid may proceed;
    at least one spindle extending axially along said fluid flow axis;

a motor operatively associated with said at least one spindle for effecting rotation of said at least one spindle, rotation of said at least on spindle producing the fluid flow; and rotation sensor means for detecting rotation of said at least one spindle.

22. The fuel dispenser according to claim 21, wherein said pump/meter further comprises:

a pair of pressure sensors, one said pressure sensor disposed in a proximity of said inlet and a second said pressure sensor disposed in a proximity of said outlet for measuring an inlet pressure and an outlet pressure, respectively.

23. The fuel dispenser according to claim 21, wherein said pump/meter further comprises:

computational means for generating a flow volume signal, said computational means operatively associated with said rotational sensor means, and said flow volume signal is operatively associated with said output device for displaying a volume of fluid to be dispensed.

24. The fuel dispenser according to claim 23 wherein said pump/meter further comprises:

said computational means operatively associated with said pair of pressure sensors;

said computational means computing a pressure difference between said inlet pressure and said outlet pressure; and said computational means generates said flow volume signal as a function of said at least one spindle rotation and said pressure difference.

25. The fuel dispenser according to claim 24, wherein said computational means further generates said flow volume signal as a function of fluid viscosity, temperature, and fluid composition.

26. The fuel dispenser according to claim 21 wherein said at least one spindle comprises a screw spindle.

27. The fuel dispenser according to claim 21, wherein said pump/meter further comprises at least one temperature sensor.

28. The fuel dispenser according to claim 21, wherein said pump/meter further comprises:

said at least one spindle comprising a pump spindle and a meter spindle, said motor operatively associated with said pump spindle and said rotational sensor means operatively associated with said meter spindle.

* * * * *